(12) United States Patent  (10) Patent No.: US 8,587,204 B2
Matthys  (45) Date of Patent: Nov. 19, 2013

(54) AMBIENCE LIGHTING SYSTEM FOR A DISPLAY DEVICE AND A METHOD OF OPERATING SUCH AN AMBIENCE LIGHTING SYSTEM

(75) Inventor: Erwin Marcel Anna Matthys, De Panne (BE)

(73) Assignee: TP Vision Holding B.V., Eindhoven (NL)

( * ) Notice: Subject to any disclaimer, the term of this patent is extended or adjusted under 35 U.S.C. 154(b) by 204 days.

(21) Appl. No.: 13/141,761

(22) PCT Filed: Dec. 18, 2009

(86) PCT No.: PCT/IB2009/055851
§ 371 (c)(1),
(2), (4) Date: Jun. 23, 2011

(87) PCT Pub. No.: WO2010/073203
PCT Pub. Date: Jul. 1, 2010

(65) Prior Publication Data
US 2011/0260626 A1    Oct. 27, 2011

(30) Foreign Application Priority Data
Dec. 23, 2008    (EP) .................................... 08172692

(51) Int. Cl.
*H05B 37/02*    (2006.01)
*H04N 13/04*    (2006.01)

(52) U.S. Cl.
USPC ........ 315/152; 315/291; 315/316; 348/223.1; 348/655

(58) Field of Classification Search
USPC ...................................................... 348/223.1
See application file for complete search history.

(56) References Cited

U.S. PATENT DOCUMENTS

| 7,052,138 B2 * | 5/2006 | Matsui .............................. 353/31 |
| 7,526,126 B2 * | 4/2009 | Oon et al. ...................... 382/167 |
| 8,026,953 B2 * | 9/2011 | Lammers et al. ........... 348/223.1 |
| 8,222,837 B2 * | 7/2012 | Galeazzi ......................... 315/318 |
| 8,233,033 B2 * | 7/2012 | Aarts et al. ....................... 348/51 |
| 2011/0249141 A1 * | 10/2011 | Chen et al. ................. 348/223.1 |

FOREIGN PATENT DOCUMENTS

| EP | 1551178 A1 | 6/2005 |
| EP | 1619934 A1 | 1/2006 |
| WO | 2007026284 A1 | 3/2007 |

* cited by examiner

*Primary Examiner* — Shawki Ismail
*Assistant Examiner* — Nelson Correa
(74) *Attorney, Agent, or Firm* — Shimokaji & Assoc., P.C.

(57) ABSTRACT

This invention relates to an ambience lighting system for a display device, where light sources are mounted at the periphery or at the rear side of the display device for emitting an ambience light onto a wall behind the display device. An input means receives color information indicating the color of the wall. A processor then adjusts the color of the emitted ambience light to the received color information of the wall such that the light reflected from the wall towards a viewing area of the display device matches the screen colors of the display device.

8 Claims, 6 Drawing Sheets

AMBIENCE LIGHTING SYSTEM FOR A DISPLAY DEVICE AND A METHOD OF OPERATING SUCH AN AMBIENCE LIGHTING SYSTEM

FIELD OF THE INVENTION

The present invention relates to an ambience lighting system for a display device and to a method of operating such an ambience lighting system.

BACKGROUND OF THE INVENTION

In the recent years, so-called Ambilight TVs have been introduced to the market. Such TVs include light sources arranged at the periphery of the TVs, which emit an ambience light onto the wall behind the TVs such that the emitted light matches the video being shown. The effect is larger virtual screen and a better viewing experience. This better viewing experience is however somewhat limited to the colors of the wall. For a white wall the viewing experience is typically maximized, whereas for a colored wall the viewing experience will not be the same.

BRIEF DESCRIPTION OF THE INVENTION

The object of the present invention is to overcome the above mentioned drawback so that the viewing experience will not be limited to certain wall colors.

According to one aspect the present invention relates to an ambience lighting system for a display device, comprising:
at least one light source mounted at the periphery or at the rear side of the display device for emitting an ambience light onto a wall behind the display device,
an input means for receiving color information indicating the color of the wall, and
a processor for adjusting the color of the emitted ambience light to the received color information of the wall such that the light reflected from the wall towards a viewing area of the display device matches substantially the screen colors of the display device.

It is thus possible to customize the ambience light to the home condition of the viewer of the display device such that the colors reflected from the wall will not appear as being different from the screen colors. In this way a lot more people can enjoy the colors effect fully without a constant mismatch between the reflected colors and the display colors.

In one embodiment, the input means is manually operated by a user which, during a setup phase of the ambience lighting system, selects the color of the wall.

Thus, a low cost solution is provided which allows the user to improve the ambilight color to the wall color and that allows the user to choose the color that matches most the ambilight color that becomes reflected from the wall.

In one embodiment, the received color information is obtained from an automatic wall color detection system.

In one embodiment, the processor adjusts the color of the emitted ambience light in accordance to a pre-defined set of rules which link the color information of the wall to the color to be emitted by the at least one light source.

In one embodiment, the pre-defined set of rules include a look-up table which link received input color information to the colors to be emitted by the at least one light source.

According to another aspect, the present invention relates to a method of operating an ambience lighting system for a display device including at least one light source mounted at the periphery or at the rear side of the display device for emitting an ambience light onto a wall behind the display device, comprising:
receiving color information indicating the color of the wall, and
adjusting the color of the emitted ambience light to the received color information of the wall such that the light reflected from the wall towards a viewing area of the display device matches substantially the screen colors of the display device.

In one embodiment, the step of receiving color information comprises:
displaying at least a part of a color triangle representing the color domain of at least one light source, and
receiving an input from a user indicating the color of the wall by selecting a color point on the displayed color triangle part.

In one embodiment, the step of adjusting the color comprises:
determining an opposite color based on the received input color, the determining being made in accordance to a reference whitepoint value,
calculating a matrix with an updated whitepoint value on that opposite color point for the color to be emitted by the at least one light source, the matrix containing said adjusted color information.

According to still another aspect, the present invention relates to a computer program product for instructing a processing unit to execute the above mentioned method steps when the product is run on a computer device. The computer device can be any types of display devices or a computer device integrated into such a display device or an external computer device that is coupled to the display device.

According to yet another aspect, the present invention relates to a display device comprising said ambience lighting system.

In one embodiment, the display device is selected from:
a LCD device,
a plasma device,
an organic light-emitting diode (OLED) device,
a projection screen.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Display devices such as TVs comprising ambience lighting system are based on emitting ambience light (ambilight) onto the wall behind the TVs which preferably matches as close as possible the colors displayed on the screen. This light forms a 'halo' on the wall next to the sides of the TV set. The perceived color on the wall only matches the display colors exactly if the wall has a white color with the same whitepoint as display and ambilight (used whitepoints are 6500K or most common 11000K). Thus, when a user has a wall that differs from perfect white (on perfect white, the measured ambilight color temperature on the wall would be exactly 11000K), the perceived color will not be a white of 11000K but some more beige for example. This means that in reality, the color match will only rarely be perfect.

Figure 1:
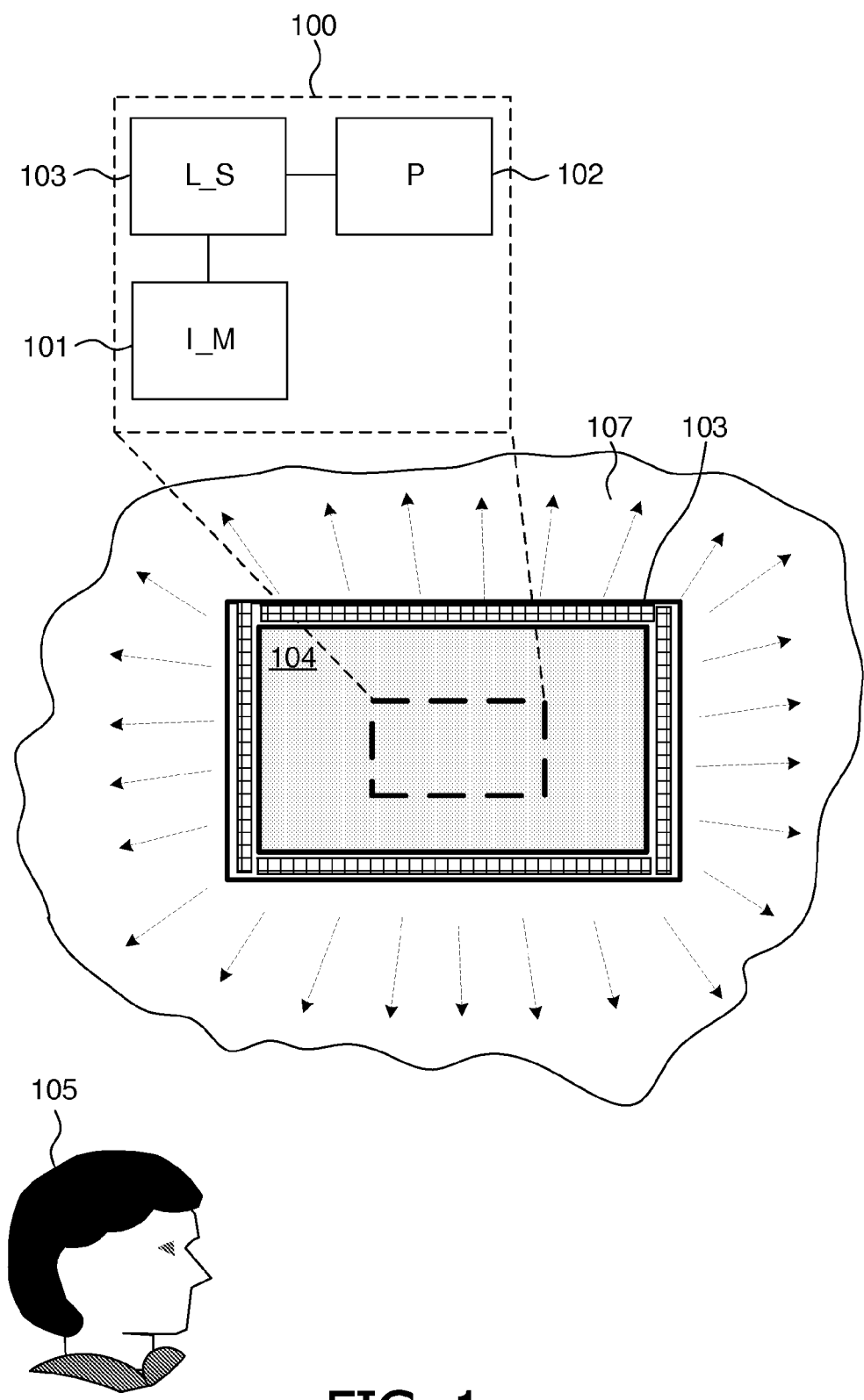
FIG. 1 shows an ambience lighting system for a display device according to the present invention.

FIG. 1 shows an ambience lighting system 100 for a display device 104 according to the present invention, but the aim with this system is to adapt the emitted ambilight colors to the actual color on the wall behind the display device 104 so that wall colors that differs from the correct white can still have the correct ambilight halo color on the wall, i.e. so that it matches the display colors. The display device can be a LCD device, a plasma device, an organic light-emitting diode (OLED) device, a projection screen and the like.

The system comprises at least one light source (L_S) 103, an input means (I_M) 101 and a processor (P) 102. The at least one light source (L_S) 103 is mounted at the periphery or at the rear side of the display device 104 for emitting an ambience light onto a wall 107 behind the display device 104. These light sources may e.g. include light emitting diodes (LEDs) or cold cathode fluorescent lamps (CCFL's), which are mounted at the periphery of one or more sides of the display device, or at the back of the display device 104.

The input means (I M) 101 is adapted to receive color information indicating the color of the wall. The input means (I_M) 101 may be operated by a user 105 who, during a setup phase of the ambience lighting system, selects the color of the wall. The input means may include e.g. a remote control, a touch button interface that is displayed on the display device that animates a keyboard, a speech command system and the like. This will be discussed in more details in conjunction with FIG. 2. The color information may be also be provided by a wall color detection system which automatically or via a command from the user 105 detects the wall color.

The processor (P) 102 is adapted to adjust the color of the emitted ambience light to the received color information of the wall such that the light reflected from the wall 107 towards a viewing area of the display device 104 matches substantially the screen colors of the display device.

This adjustment may be done in accordance to a pre-defined set of rules which link the color information of the wall to the color to be emitted by the at least one light source. These pre-set of rules may be in the form of a look-up table which link received input color information to the colors to be emitted by the at least one light source so that a match is obtained between the colors reflected from the wall 107 and the colors that are being displayed. This look-up table may be a kind of calibration table where the dependency between the colors emitted by the at least one light source and reflected colors is analyzed such that the reflected colors match as close as possible to the colors on the display. By the term "colors on the display" can mean the colors at different regions of the periphery on the display, e.g. the right side at the periphery. This means that the emitted colors by the light sources at the right side of the display device 104 is such that the reflected light from the wall 107 on the right side matches as close as possible the colors on right side on the display. This right side (and the remaining sides) could also be portioned into sub-regions where e.g. a group of light sources belong to these regions. Thus, if e.g. the upper part of the right side shows a red light, the emitted light from the light sources in this region emit lights such that the reflected light becomes also red. The same applies for the remaining sides of the display. The colors on the display can also mean the average or the dominant color. In such a situation, all the light sources would emit the same color such that the reflected color matches as close as possible this dominant or average color.

Assuming the light sources are red/green/blue LEDS, in general the color white is a combination of 100% red 100% green an 100% blue. This means that if all the light sources are driven 100% the result is a white color. However, there are several possible tints of white. White can be on the bluish side (cool white) or more towards red-green (warm white). In televisions for example, there are predefined values that are used to describe the tint of white: cool white has a color temperature of 11000K, normal white has a color temperature of 9300K and warm white has a color temperature of 6500K. White can also be defined by coordinates x,y of the color triangle, for example warm white has a x=0.312 and y=0.322. When the appropriate types of LEDs are used as light sources in such an ambilight system 100 and are driven at 100% the result will be some kind of white color. Typically, this white is not equal to one of the values that can be used. So, in one embodiment a 3×3 matrix is defined which defines how much red, green and blue really should be driven to get a good white according the wanted color temperature. The matrix may also have a gain factor for red, green and blue for service purposes. In this way the factory or a service technician can easily adjust the color temperature if for some reason not all the light sources used in the display device show the same white. The purpose of this extra gain factor may be an advantage in relation to a quick service purposes. When for some reason light sources are not perfectly aligned or there is in some light sources a color degradation over time, a service person may easily (on sight) add some more red for example without difficult matrix recalculations and re-alignment the light sources. Thus, it is possible to give the light sources a color shift opposite to the wall color.

Figure 2:
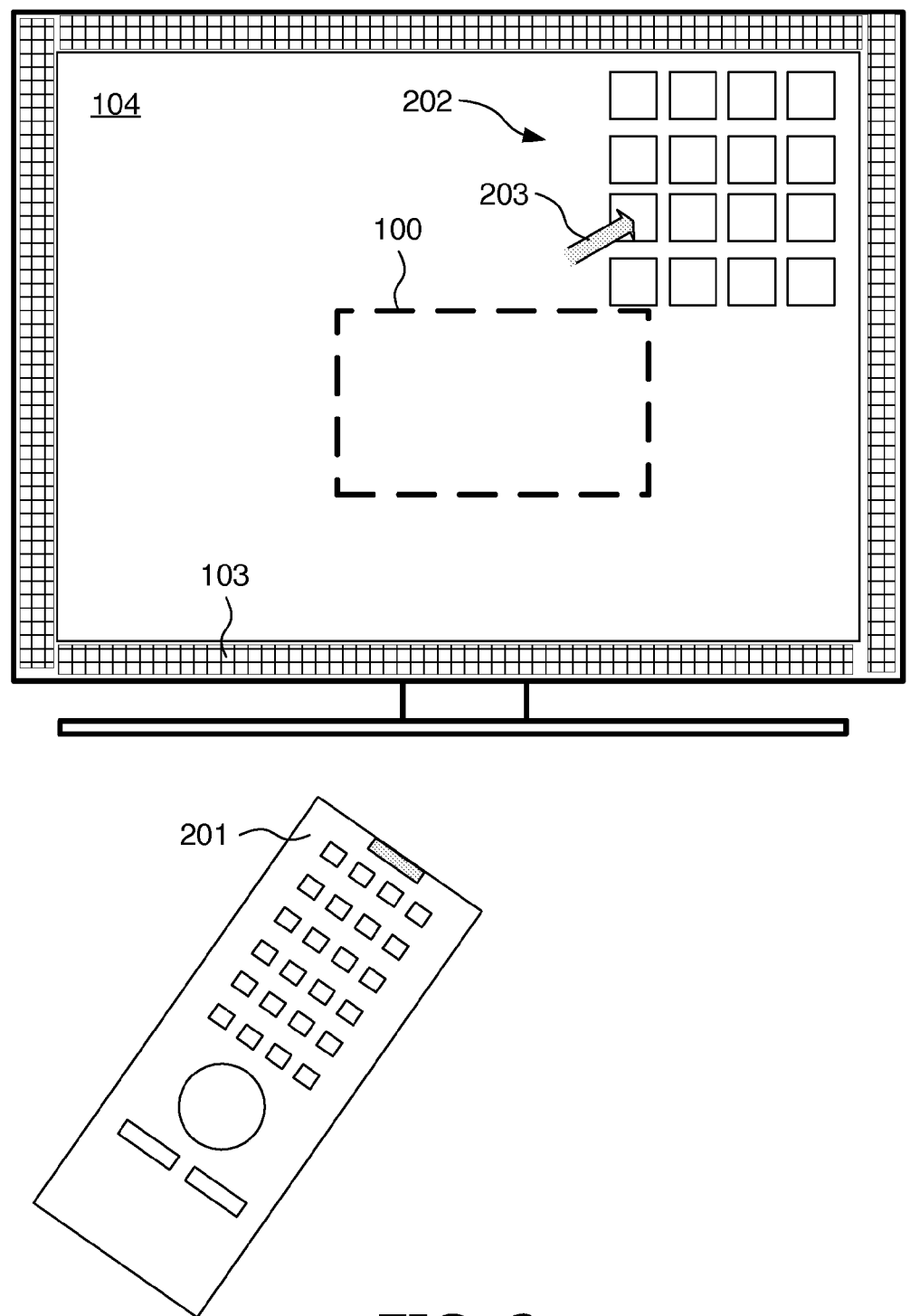
FIG. 2 depicts graphically the scenario where e.g. the user sets up the ambilight system by selecting color information indicating the color of the wall behind the display device.

FIG. 2 depicts graphically the scenario where e.g. the user 105 sets up the ambilight system 100 by selecting color information indicating the color of the wall behind the display device 104. One way of doing so is to by selecting a "Setting Assistance" or similar via e.g. a remote control 201 by pushing the appropriate setup button. One of the setup features could then be to setup the ambilight system. The choices of the user 105 will be saved and used as the TV settings until the user changes something in menu or enters the settings assistant again and changes his preferences. There may also be a factory recall provision, which restores all TV settings to their originals, including the ambilight settings.

As depicted here, the display device 104 is a TVs device (e.g. a LCD TV) and the input means is a TV remote control. After selecting the "Setting Assistance" for the ambilight system, the user may be provided with various setups where the user can select the color of the wall 107 behind the TV. This may e.g. be done by displaying multiple color frames 202, where the user 105 selects one of the frames using the control cursors 203, which has a color matching the color of the wall 107. This could also be done by displaying a rectangle on screen with 3 sliders (Red, Green and Blue) next to it (not shown), a store button and a text message explaining the customer how he can adjust/improve his ambilight performance, where the sliders could be adjusted with the control cursors 203 operated via the remote control 201 until the displayed rectangle color matches as close as possible to the wall. After finding the correct color, the received color information is stored by e.g. pushing an appropriate store button on the remote control. In another scenario, a part of the color triangle could be displayed on the TV screen (see FIG. 3) and a big rectangle below it representing the color chosen. With the 203 cursor the user 105 moves towards his wall color and checks this on the bigger rectangle. Once the match looks OK, the user stores the setting.

As discussed previously, after selecting the color information, the user has entered the color information of the wall 107. Referring to the embodiment discussed previously, behind these color information may be a look-up table where the entered color information are linked to the colors to be emitted such that the colors reflected from the wall 107 because the same or almost the same as the colors on the display device 104.

The chosen color information can also be used to calculate a new whitepoint and matrix for the ambilight colors to be emitted. This could work in the following way: the ambilight light sources are default programmed with a color matrix and whitepoint of 11000K on the black body curve (coordinates x 0.275, y 0.283). The color of the wall gives color coordinates which represent a point on the color triangle different from the default 11000K whitepoint. By mirroring the wall color point with respect to the 11000K whitepoint with a straight line, one ends up in a new color point that can be used as new whitepoint reference for the light sources 103. Thus, one ends up in an inverse like color of the wall color as base for the light sources 103. This method works especially well for 'pastel' like wall colors. The light sources 103 are then associated with two matrixes, one default 11000K matrix with default gain factors and one new customized matrix. The customized matrix will be used until the user makes new changes via the setting assistant or via a factory recall which restores all default factory settings (picture, sound, ambilight etc). When a factory recall of TV settings is done, the customized matrix will be cleared and the default matrix will be chosen again.

Another method of correcting the perceived ambilight colors on the wall is by leaving the matrix untouched and by only adjusting the gain factors for each color, as it is done for service purposes.

Figure 3:
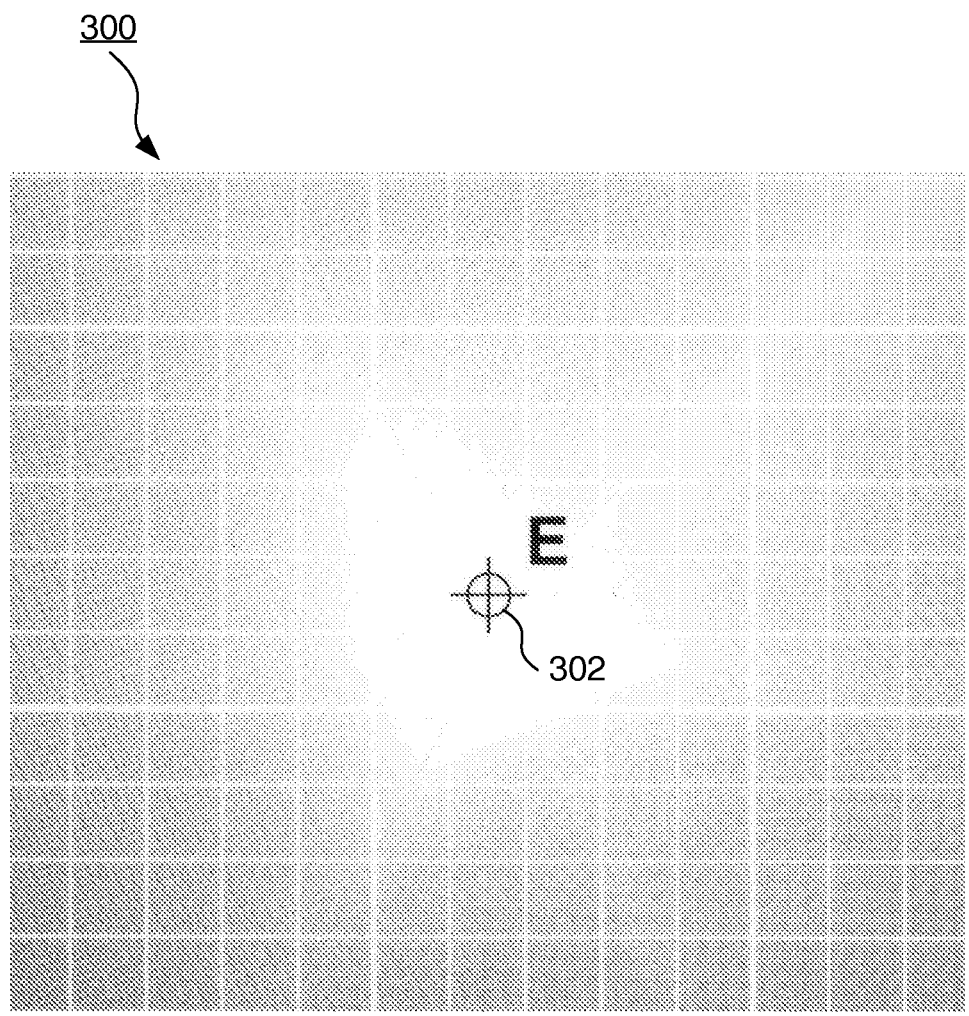
FIG. 3 shows a part of a color domain from the color triangle shown in FIG. 4 that may be displayed for a user of the display device during a setup phase of the display device.
Figure 4:
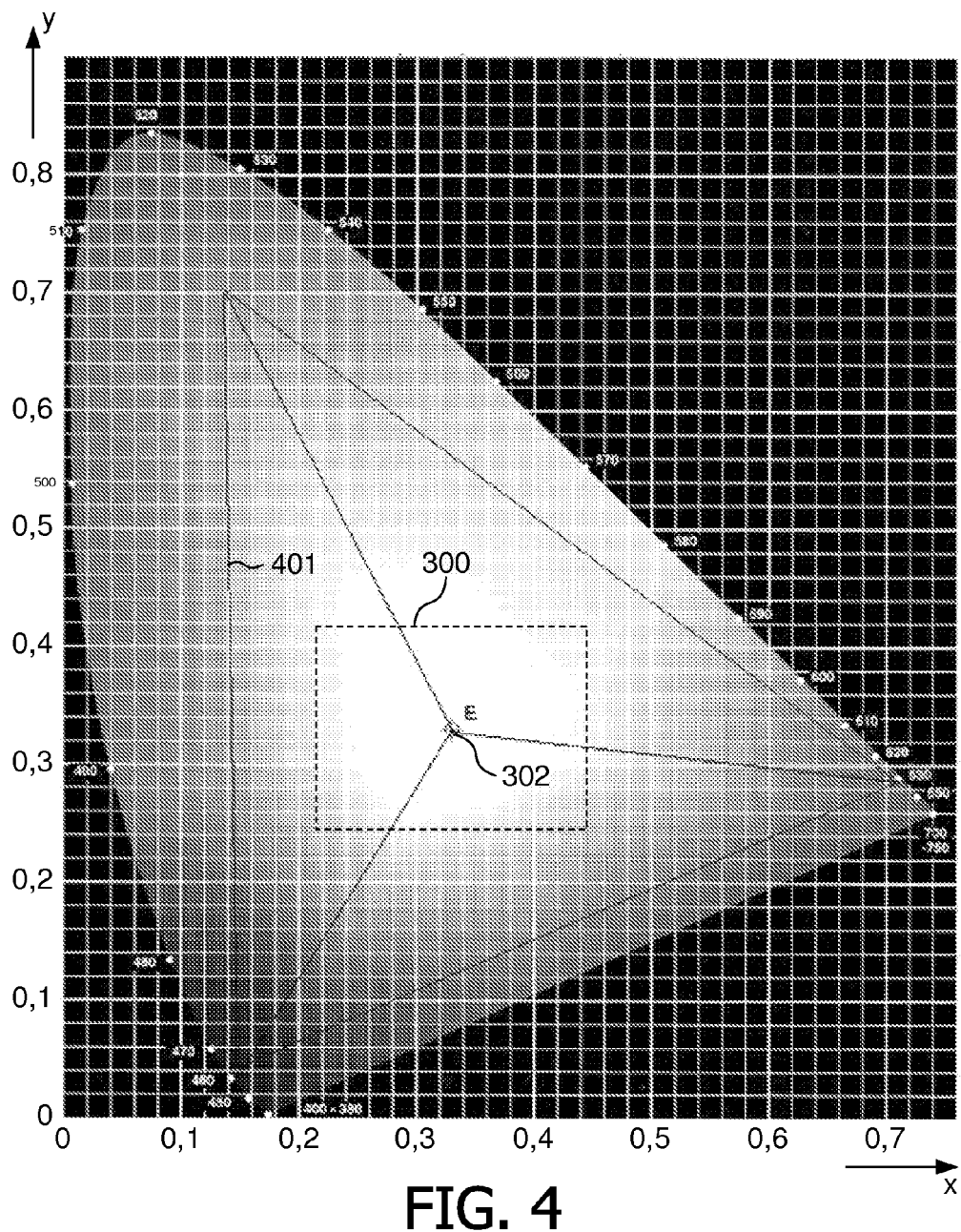

For further clarification of the working principle of this embodiment, FIG. 3 shows a part of a color domain 300 from the color triangle 401 in FIG. 4 that may be displayed for the user 105 of the display device 104 during the setup phase and which the user may choose between. The color triangle in FIG. 4 is shown with 3 extra lines drawn, starting from the original whitepoint, towards the color primary's of the lighting device This part represents the color domain 300 of the light sources 103 of the ambience lighting system 100, e.g. the LEDs, where all the colors within this part 300 are the colors that can emitted by the light sources. The center of the color domain 300 shows a given whitepoint, marked E 302. This is an example of a warm 6500K whitepoint.

Figure 5:
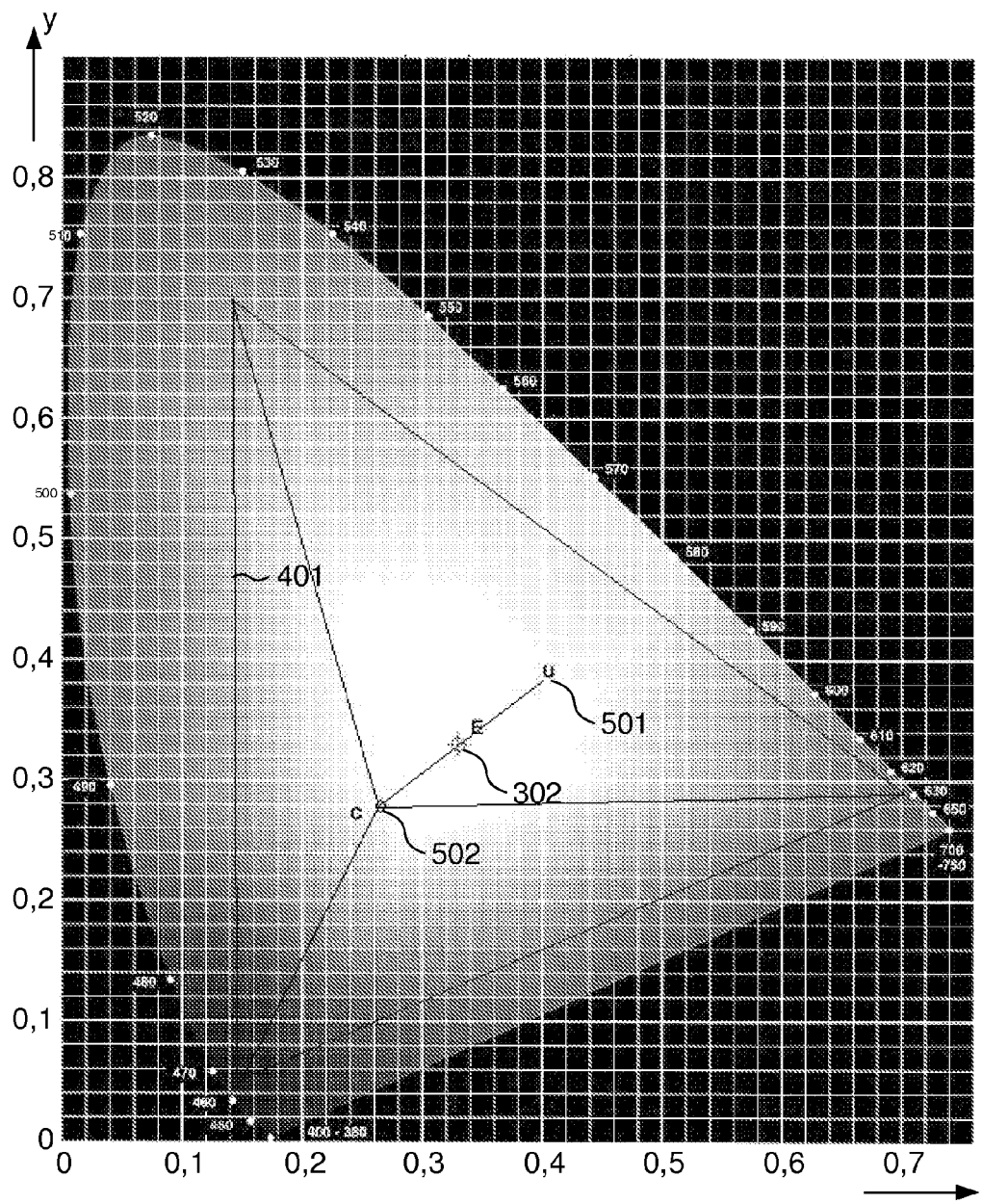
FIG. 5 shows in addition to the color triangle in FIG. 4, a point representing the reflected color when pure white is displayed on it.

FIG. 5 shows in addition to the color triangle 401 in FIG. 4, a point U 501 representing the reflected color (yellow) when pure white is displayed on it. The wall color here is yellow. By mirroring the point U 501, i.e. by drawing a straight line from point U 501 through the original whitepoint E 302 towards a new point C (distance from E to U is the same as from C to E), a new point C 502 is obtained which represents the opposite color of point U. Instead of showing the color triangle with 3 extra lines drawn starting from the original whitepoint E 302 as shown in FIG. 4, the 3 extra lines start now from the new whitepoint C 502 in case of a yellowish wall (point U 501). Thus, the (x,y) coordinates of this point C 502 in relation to the (x,y) coordinates of the original whitepoint E 302 can be used to calculate the new matrix or needed correction factor for the light colors to be emitted by the light sources. This scenario explains how new whitepoint can be determined and thus how the color information of the emitted white light should be.

When the display makes for example a transition from full white color towards full green, one can see on FIGS. 4 and 5 how the colors will be displayed when the yellow line is followed from white towards green. In case of FIG. 5, there is a clear color shift visible with respect to the case in FIG. 4. The biggest shift is made near the whitepoint, the smallest near the green point. This is logical because highly saturated colors (near to green) doesn't need that big shift anymore since they will be dominant over the wall color.

It should be noted that if a shifted color ends up outside of the color triangle of the led system, the displayed color will be on the edge of the triangle since the led system can only display colors that are inside or maximum on the edge of the triangle.

EXAMPLE

To match the colors that will be reflected from said wall to the colors that are being displayed (it will be assumed that the light sources are light emitting diodes (LEDs)) it is very important that the color primaries and the whitepoint of the LEDs match with those of the display system. In practice this is rarely the case, so a 3×3 matrix is needed to correct the emitted LED output.

Suppose LEDs system with following color primaries is needed:
R: x=0.64, y=0.33
G: x=0.29, y=0.6,
B: x=0.15, y=0.068,
and assume that a warm whitepoint of 6500K on x=0.312 and y=0.322 is desired.

A correction matrix can then be calculated out of the original LED systems primaries and light output. With other words, one needs to know for RED, Green and BLUE where the original coordinates are and how much light is coming out of each color.

Out of a real actual situation: the following values were measured:

| $x_{r1} := 0.6947$ | $x_{g1} := 0.190$ | $x_{b1} := 0.137$ |
| $y_{r1} := 0.304$ | $y_{g1} := 0.715$ | $y_{b1} := 0.0520$ |
| $Y_{r1} := 219$ | $Y_{g1} := 560$ | $Y_{b1} := 98.3$ | x and y values are the coordinates for red (r), green (g) and blue (b), and Y being the light output in Nits (Cd/m2) for r, g and b.

These values are input for a calculation algorithm (in this case a Mathcad calculation was applied) that results in a correction matrix.

In this particular case, the result of the Mathcad output is:

$$\begin{pmatrix} A_{rr} & A_{gr} & A_{br} \\ A_{rg} & A_{gg} & A_{bg} \\ A_{rb} & A_{gb} & A_{bb} \end{pmatrix} = \begin{pmatrix} 0b5h & 42h & 8h \\ 0fh & 0e1h & 5h \\ 2h & 6h & 86h \end{pmatrix}$$

This is the original matrix that will be used, resulting in a whitepoint E on the color triangle (see FIGS. 3-5).

The 'h' after each value means that the values are not decimal but hexadecimal.

The first line is for red where Arr stands for full red color, Agr stand for the amount of green color that is added to red color and Abr is the amount of blue color that is added to red color (0b5 is the red color value, 42 is the amount of green color that is added to this red color and 8 is the amount of blue color that is added to the red (just a little amount). In other words, if the display has for example full red on screen and this is to be matched with the lighting system (LEDs), then the LED's need to be driven as follows: drive the red LED with a value B5h (on a scaling of 0h to FFh (0 to 255 in decimal)), drive the green LED with a value 42h and drive the blue LED with 8h.

This results in a red that tends to orange, since there is an important amount of green in it.

The second line is green color, where Agg is full green color, Arg is the amount of red in the green color and Abg is the amount of blue in the green color. 0e1 is the value for green, and the 0f and the 5 are the amounts of red and blue colors, respectively, that have been added to the green color.

The last line is blue color, where Abb is the full blue color, Arb is the amount of red in the blue color and Agb is the amount of green in the blue color. 86 is the blue color value, 2 and 6 are the amounts of red and green, respectively, that are added to the blue color.

These matrix values are programmed for a processor (microprocessor) that drives the LED's. On a perfect white wall, the user will see the ambilight colors matching the displays.

Referring now to the previous example (see FIG. 5) with the yellowish wall, then the color that the user will see when full white is emitted has coordinates x=0.4 and y=0.38 on the color triangle.

Behind the possible user choices there is a look-up table with opposite color coordinates. In this case, the coordinates will be x=0.262 and y=0.28, see point C in FIG. 5.

With mathcad, a new matrix can thus be calculated giving following result:

$$\begin{pmatrix} A_{rr} & A_{gr} & A_{br} \\ A_{rg} & A_{gg} & A_{bg} \\ A_{rb} & A_{gb} & A_{bb} \end{pmatrix} = \begin{pmatrix} 7bh & 46h & 0ch \\ 0ah & 0edh & 8h \\ 1h & 6h & 0cah \end{pmatrix}$$

These are the matrix values that the processor will be working from for driving the light sources with wall-adapted values.

From now on, the modules will give purplish-blue white, resulting in normal perceived warm white when mixed on the wall color.

Figure 6:
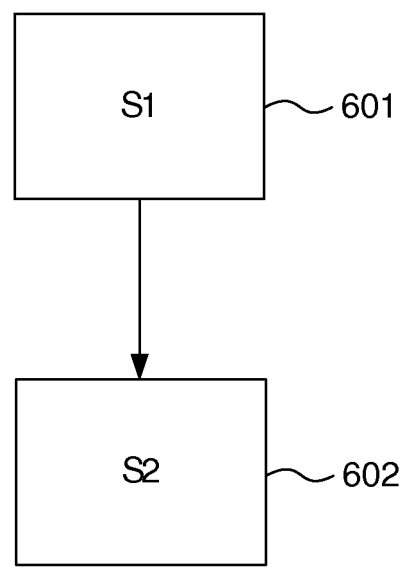
FIG. 6 shows a flowchart of a method according to the present invention of operating an ambience lighting system for a display device.

FIG. 6 shows a method according to the present invention of operating an ambience lighting system for a display device including at least one light source mounted at the periphery or at the rear side of the display device for emitting an ambience light onto a wall behind the display device.

In step (S1) 601, the color information indicating the color of the wall is received. As mention previously in FIGS. 1 and 2, this may either be done via manual input from a user or via an automatic wall color detection system. In one embodiment, the step of receiving color information comprises displaying a part of a color triangle representing a part of the color domain of the at least one light source, and receiving an input from a user indicating the color of the wall by selecting a color point on the displayed color triangle.

In step (S2) 603, the color of the emitted ambience light is adjusted to the received color information of the wall such that the light reflected from the wall towards a viewing area of the display device matches substantially the screen colors of the display device. Referring to FIGS. 1 and 2, such an adjustment may e.g. be performed via a pre-defined set of rules which link the color information of the wall to the color to be emitted by the at least one light source, where the pre-defined set of rules can be in a form of a look-up table which link received input color information to the colors to be emitted by the at least one light source. As discussed previously, such an adjustment may also be done by displaying at least a part of a color triangle representing the color domain of the at least one light source, and receiving an input from a user indicating the color of the wall by selecting a color point on the displayed color triangle part. Then, an opposite color is determined based on the received input color, where the determining being made in accordance to a reference whitepoint value. Finally, a matrix is calculated with an updated whitepoint value on that opposite color point for the color to be emitted by the at least one light source. For further clarification, see FIGS. 3-5.

As shown in FIG. 2, a typical scenario of an implementation of these method steps is where a buyer of e.g. a new ambilight TV device wants to install the TV or change the installation because the user has just painted the wall behind the TV. The user enters a 'Setting Assistant' via the remote control of the TV and there the user selects "ambilight setup" or similar. A graphical interface may be displayed on the TV where the user can e.g. via the remote control via scrolling function select the color on the background wall, as discussed previously in FIG. 2.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An ambience lighting system for a display device, comprising:
   at least one light source mounted at the periphery or at the rear side of the display device for emitting an ambience light onto a wall behind the display device;
   an input means for receiving color information indicating the color of the wall; and
   a processor for adjusting the color of the emitted ambience light to the received color information of the wall such that the light reflected from the wall towards a viewing area of the display device matches substantially the screen colors of the display device;
   wherein the processor adjusts the color of the emitted ambience light in accordance with instructions selected from the group consisting of:
   a pre-defined set of rules, including a look-up table, which link the received color information of the wall to the color to be emitted by the at least one light source; and
   determining a color point opposite the received input color, the determining being made in accordance to a reference whitepoint value, and calculating a matrix with an updated whitepoint value based on the opposite color point for the color to be emitted by the at least one light source, the matrix containing said adjusted color information.

2. An ambience lighting system according to claim 1, wherein the input means is manually operated by a user which, during a setup phase of the ambience lighting system, selects the color of the wall.

3. An ambience lighting system according to claim 1, wherein the received color information is obtained from an automatic wall color detection system.

4. A display device comprising an ambience lighting system as claimed in claim 1.

5. A display device according to claim 1, wherein the display device is selected from the group consisting of at least one of:
  a LCD device;
  a plasma device;
  an organic light-emitting diode (OLED) device; and
  a projection screen.

6. A method of operating an ambience lighting system for a display device including at least one light source mounted at the periphery or at the rear side of the display device for emitting an ambience light onto a wall behind the display device, comprising:
  receiving color information indicating the color of the wall; and
  adjusting the color of the emitted ambience light to the received color information of the wall such that the light reflected from the wall towards a viewing area of the display device matches substantially the screen colors of the display device;
  wherein adjusting the color of the emitted ambience light comprises steps selected from the group consisting of:
    adjusting the color in accordance to a pre-defined set of rules, including a look-up table, which link the received color information of the wall to the color to be emitted by the at least one light source; and
    determining a color point opposite the received input color, the determining being made in accordance to a reference whitepoint value, and calculating a matrix with an updated whitepoint value based on the opposite color point for the color to be emitted by the at least one light source, the matrix containing said adjusted color information.

7. A method according to claim 6, wherein the step of receiving color information comprises:
  displaying at least a part of a color triangle representing the color domain of the at least one light source; and
  receiving an input from a user indicating the color of the wall by selecting a color point on the displayed color triangle part.

8. A computer program product for instructing a processing unit to execute the method step of claim 6 when the product is run on a computer device.

* * * * *